United States Patent [19]

Okita et al.

[11] Patent Number: 4,671,998

[45] Date of Patent: Jun. 9, 1987

[54] MAGNETIC RECORDING MEDIUM

[75] Inventors: Tsutomu Okita; Masashi Aonuma; Hiroshi Hashimoto, all of Kanagawa, Japan

[73] Assignee: Fuji Photo Film Co., Ltd., Kanagawa, Japan

[21] Appl. No.: 831,686

[22] Filed: Feb. 21, 1986

[30] Foreign Application Priority Data

Feb. 21, 1985 [JP] Japan .................................. 60-31601

[51] Int. Cl.$^4$ ............................................ G11B 5/702
[52] U.S. Cl. .................................. 428/411.1; 427/44; 427/128; 252/62.54; 428/522; 428/425.9; 428/694; 428/900
[58] Field of Search ................. 427/44, 128; 428/694, 428/900, 695, 425.9, 522, 411.1; 252/62.54; 360/134–136

[56] References Cited

U.S. PATENT DOCUMENTS

| 4,004,997 | 1/1977 | Tsukamoto | 204/159.14 |
| 4,343,831 | 8/1982 | Tsuji | 427/128 |
| 4,407,353 | 10/1983 | Okita | 427/44 |
| 4,428,974 | 1/1984 | Okita | 427/44 |
| 4,448,846 | 5/1984 | Chang | 428/900 |
| 4,448,848 | 3/1984 | Okita | 428/447 |
| 4,482,610 | 11/1984 | Okita | 428/483 |
| 4,518,656 | 5/1985 | Okita | . |

Primary Examiner—Ellis P. Robinson
Attorney, Agent, or Firm—Sughrue, Mion, Zinn, Macpeak, and Seas

[57] ABSTRACT

A magnetic recording medium having an improved durability is disclosed, which comprises a support having provided thereon a magnetic layer containing ferromagnetic particles and a binder, that is exposed to radiation, wherein the binder comprises a compound having one or more triazine rings and at least two vinyl groups per molecule.

9 Claims, No Drawings

MAGNETIC RECORDING MEDIUM

FIELD OF THE INVENTION

The present invention relates to a magnetic recording medium, such as video tapes, audio tapes, computer tapes, or magnetic discs.

BACKGROUND OF THE INVENTION

Magnetic recording media which are generally and widely used these days typically employ as a binder a thermoplastic resin alone or in combination, such as a vinyl chloride-vinyl acetate type resin, a vinyl chloride-vinylidene chloride type resin, a cellulose resin, an acetal resin, and a urethane resin, or an acrylonitrile-butadiene resin. Such magnetic recording media have defects such as that as the wear resistance of a magnetic layer is poor, the tape path of magnetic tapes easily stains.

It is known that as a binder, a thermosetting resin such as a phenol-formaldehyde resin, or a urea resin is used and that a binder of the above-described thermoplastic resin to which a binder cross-linkable by a chemical reaction such as an isocyanate compound or an epoxy compound is added is used. However, the use of the cross-linkable binder is accompanied by defects such as that (1) a resin solution having dispersed magnetic particles therein has poor storage stability, that is, pot life is short, physical properties of magnetic coating composition are not homogeneous and a magnetic tape cannot have homegeneous quality, and that (2) after a magnetic coating composition is coated and dried, a heat treatment is necessary for hardening the coated layer, so that a long period of time is necessary for manufacturing the product.

In order to overcome the above defects, a method for preparing a magnetic recording medium using as a binder an oligomer and a monomer of acrylic acid ester type and hardening the binder by electron beam irradiation after drying is disclosed in U.S. Pat. Nos. 3,871,908 and 4,443,490, Japanese Patent Publication No. 12423/72 and Japanese Patent Application (OPI) Nos. 15104/72 and 77433/75, (the term "OPI" used herein means unexamined Japanese Patent Application). However, a magnetic recording medium having high electromagnetic properties and running durability cannot be obtained by the above method.

Recently, a support of a magnetic tape has been required to be thin in order to provide long term recording, and mechanical properties of a magnetic layer has been required to be improved. For example, a magnetic tape is required to be used under harsh conditions. However, satisfactory physical properties to meet the above requirements cannot be provided with a magnetic layer.

SUMMARY OF THE INVENTION

A first object of the present invention is to provide a magnetic recording medium having excellent electromagnetic properties.

A second object of the present invention is to provide a magnetic recording medium having excellent durability.

A third object of the present invention is to provide a magnetic recording medium having a mechanically excellent magnetic layer.

A fourth object of the present invention is to provide a magnetic recording medium, in which quality is to provide a magnetic recording medium, in which quality is homogeneous and of which magnetic coating composition has good storage stability.

A fifth object of the present invention is to provide a magnetic recording medium which can be prepared without heat treatment for hardening a coated layer.

In order to overcome the above-described defects, the inventors of the present invention made extensive studies as to methods of using a thermoplastic resin and a thermosetting resin, of adding a binder which is cross-linkable with a chemical reaction, and of using a hardenable binder which is cross-linkable with electron beam irradition, and have now attained the present invention.

As a result of thorough investigations, the inventors of the present invention have found that the above objects can be accomplished by a magnetic recording medium comprising a support having provided thereon a magnetic layer containing ferromagnetic particles and a binder, that is exposed to radiation, wherein the binder comprises a compound having one or more triazine rings and at least two vinyl groups per molecule.

It has also been found that it is more effective when the binder further comprises a urethane acrylate oligomer.

In accordance with the present invention, then, a magnetic recording medium having good electromagnetic properties and remarkably good durability has been realized.

DETAILED DESCRIPTION OF THE INVENTION

Ferromagnetic particles used in the present invention include ferromagnetic iron oxide particles, Co-doped ferromagnetic iron oxide particles, ferromagnetic chromium dioxide particles, and ferromagnetic alloy particles and barium ferrite. An effective acicular ratio of ferromagnetic iron oxide and chromium dioxide is from 2/1 to 20/1, and preferably the ratio is 5/1 or more and the average particle length is about from 0.2 to 2.0 $\mu$m. Ferromagnetic alloy particles have metal content of 75 wt% or more, 80 wt% or more of the metal content is ferromagnetic metal (i.e., Fe, Co, Ni, Fe-Co, Fe-Ni, Co-Ni, Fe-Co-Ni), and the longest diameter is about 1.0 $\mu$m or less.

Organic solvents to be used for dispersing ferromagnetic particles and coating a coating composition include ketones such as acetone, methyl ethyl ketone, methyl isobutyl ketone, or cyclohexanone; esters such as methyl acetate, ethyl acetate, butyl acetate, ethyl lactate, or monoethyl ether of glycol acetate; glycol ethers such as ether, glycol dimethyl ether, glycol monoethyl ether, or dioxane; aromatic hydrocarbons such as benzene, toluene, or xylene; chlorinated hydrocarbons such as methylene chloride, ethylene chloride, carbon tetrachloride, chloroform, ethylene chlorohydrain, or dichlorobenzene; and tetrahydrofuran.

The compound used as a binder in the present invention has one or more, preferably 1 to 3, triazine rings and at least two, preferably 2 to 14, and more preferably 2 to 6, vinyl groups per molecule. Preferred compounds include those represented by formulae (I), (II) and (III):

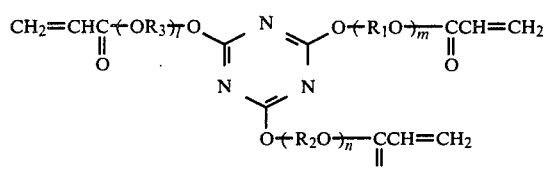 (I)

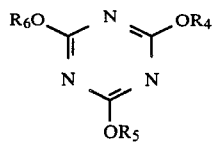 (II)

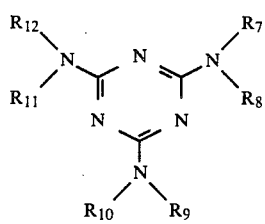 (III)

wherein $R_1$, $R_2$ and $R_3$, each represents —$CH_2CH_2$— or

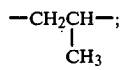

$R_4$, $R_5$ and $R_6$, each represents a hydrogen atom, —$CH_2CH=CH_2$ or

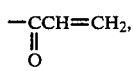

provided that two of $R_4$, $R_5$ and $R_6$ are not a hydrogen atom at the same time; $R_7$, $R_8$, $R_9$, $R_{10}$, $R_{11}$ and $R_{12}$, each represents

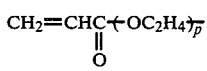

(wherein p is an integer of 1 to 4), $CH_3$—, $C_2H_5$—, iso-$C_3H_7$— or a hydrogen atom, provided that at least two of $R_7$ to $R_{12}$ are

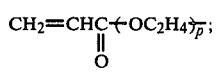

and l, m and n are 0 or an intager of 1 to 4, provided that l, m and n are not 0 at the same time.

Examples of such compounds include:

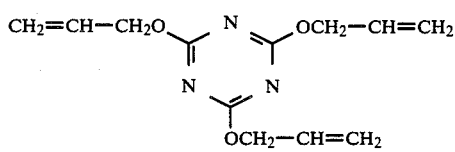

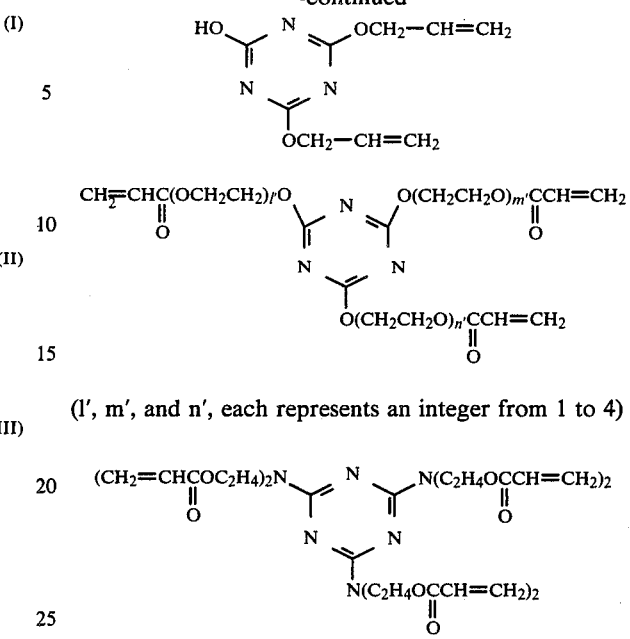

(l', m', and n', each represents an integer from 1 to 4)

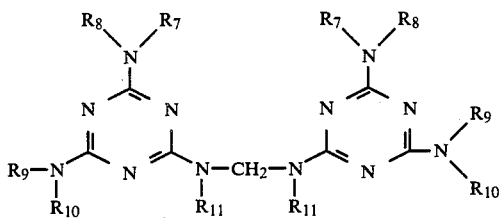

Further, it may be a polymer, such as a dimer or a trimer of the compound represented by formula (III), for example, wherein $R_7$-$R_{11}$ are as defined above.

Durability is further improved when urethane acrylate oligomer is used together with the compound having one or more triazine rings and at least two vinyl groups.

A urethane acrylate oligomer which can be obtained by reacting a urethane prepolymer having an isocyanate group at the terminal and/or at the side chain with a compound having (meth)acryloyl group and which has an average molecular weight of 1,000 or more and preferably 3,000 or more is preferably used in the present invention.

When the molecular wieght thereof is less than 1,000, a magnetic layer of thus obtained magnetic recording medium tends to be too hard and be easily cracked when bent, or a megnetic recording medium readily curls when a urethane acrylate oligomer hardens and shrinks after electron beam irradiation. The upper limit of the molecular weight is not particularly limited, but is preferably 100,000 or less. When the molecular weight is more than 100,000, the urethane acrylate oligomer dissolves into a solvent with difficulty, therefore, handling is not easy and dispersibility of magnetic particles becomes poor.

A urethane prepolymer having an isocyanate group at the terminal and/or at the side chain includes a polyether type and a ployester type. A compound having (meth)acryloyl group includes a hydroxyl group-containing (meth)acrylate such as 2-hydroxyethyl(meth)acrylate, tetraethylene glycol mono(meth)acrylate, diethylene glyecol mono(meth)acrylate, triethylane glycol mono(meth)acrylate, trimethylolpropane mono(meth)acrylate, trimethylolpropane di(meth)acrylate or pentaerithritol tri(meth)acrylate, and (meth)acrylic acid.

Further, if desired, thermoplastic resins and acrylates of these thermoplastic resins can be also added as a binder. Such thermoplastic resins include vinyl chloride type copolymers such as a copolymer of vinyl chloride and vinylidene chloride, a copolymer of vinyl chloride and vinyl acetate, a copolymer of vinyl chloride, vinyl acetate and vinyl alcohol, a copolymer of vinyl chloride, vinyl acetate and maleic acid, a copolymer of vinyl chloride, vinyl propionate and acrylic acid, a copolymer of vinyl chloride, vinyl propionate and vinyl butenoate, or a copolymer of vinylidene chloride, vinyl acetate and maleic acid; celluloses such as cellulose acetate butylate, cellulose acetate propionate, cellulose nitrate, or cellulose diacetate; polyvinyl formal resins such as vinyl formal, vinyl acetal, or vinyl butyral; a copolymer of acrylonitrile and butadiene; and a copolymer of ethylene and vinyl acetate. A urethane resin can also be added.

A compound having a molecular weight of 500 or less and having one or more carbon-carbone unsaturated bond in a molecule and which can be polymerizable by radiation exposure can also be added, if desired. Examples of the above compound are ethylene glycol diacrylate, triethylene glycol diacrylate, 1,6 hexanediol, diacrylate, neopentyl glycol diacrylate, trimethylolpropane, triacrylate, glycerine triacrylate, pentaerythritol tetraacrylate, dipentaerythritol hexaacrylate, diacryloyloxyethyl phosphate, hydroxypivalic acid neopenthyl glycol diacrylate, 2-hydroxyethyl acrylate, tetrahydrofurfuryl acrylate, 2-ethylhexyl acrylate, phenoxyethyl acrylate, dicyclopentadienyl acrylate, methacrylates of these compounds, N-vinylpyrolidone, styrene, acrylic acid, and methacrylic acid.

The compound having a triazine ring and at least two vinyl groups is preferably contained in an amount of from 10 to 80 wt% and more preferably from 20 to 70 wt%, based on the total amount of binder. When the compound is contained in an amount less than the above range, it is not preferred, because sufficient durability cannot be obtained. The urethane acrylate oligomer is preferably added in an amount of from 20 to 90 wt% and more preferably from 30 to 80 wt%, based on the total amount of binder.

Additives such as a lubricating agent, an abrasive agent, a dispersing agent, an antistatic agent, or a rust preventing agent can be added into the magnetic coating composition of the present invention. The lubricating agent includes saturated and unsaturated higher fatty acid, a fatty acid ester, a higher fatty acid amide, a higher alcohol, a silicone oil, a mineral oil, an edible oil, and fluoride type compounds. These additives can be added upon preparing a coating composition, or can be coated or sprayed on a surface of a magnetic layer with or without an organic solvent after drying, smoothing the magnetic layer or hardening the magnetic layer by electron beam irradiation.

Materials for the support used for coating a magnetic coating composition include polyesters such as polyethylene terephthalate or polyethylene-2,6-naphthalate; polyolefins such as polyethylene or polypropylene; cellulose derivatives such as cellulose triacetate; plastics such as polycarbonate, polyimide, or polyamideimide; non-magnetic metals such as aluminium, copper, tin, zinc, or non-magnetic alloy including the above metals; plastics having a vapour-deposited metal layer such as aluminium; and a paper or a paper coated or laminated with polyolefins.

The shape of the support can be a tape, a sheet, a card, a disc, a drum, or the like and the materials for the support can be selected depending upon the shape thereof.

It is effective that a backing layer is provided on the back surface of the support opposite to the magnetic layer for the purpose of preventing static charging, pring through and wow flutter and improving the strength of the magnetic recording medium, and making the back surface of the support a matted layer.

Radiation exposure referred to in the present invention includes an ultraviolet ray, an electron beam, $\gamma$-ray, $\beta$-ray, and X-ray, and preferably is an electron beam. A device of accelerating electron beams can be used as an electron beam irradiation device, such as a scanning method, a double scanning method, a curtain beam method, or a broad beam curtain method.

The electron beam irradiation can be carried out using an accelerating voltage of from 100 to 1000 kV, preferably from 150 to 300 kV, and an absorption dose of from 1.0 to 20 megarads, preferably from 2 to 15 megarads. When the accelerating voltage is less than 100 kV, the amount of energy transmitted is insufficient, and when the accelerating voltage exceeds 1000 kV, the energy efficiency used for polymerization decreases and is uneconomical. When the absorption dose is less than 1.0 megard, the hardening reaction is insufficient to obtain the desired mechanical strength of a magnetic layer. When the absorption dose is more than 20 megarads, the energy efficiency used for the hardening reaction is lowered or the irradiated object generates heat, whereby the plastic support tends to deform.

The present invention is further illustrated in more detail by the following Examples and Comparative Examples. In the Examples and Comparative Examples, all parts are by weight.

EXAMPLE 1

| | |
|---|---|
| $\gamma$-Fe$_2$O$_3$ (Hc: 650 Oe, 0.5 $\mu$m × 0.05 $\mu$m) | 400 parts |
| Binder Ingredients: | |
| Urethane acrylate (Urethane acrylate oligomer having an acryloyl group at the terminal, which is obtained from the reaction of urethane prepolymer having OH group at the terminal comprised of sebasic acid, butanediol and diphenyl methane diisocyanate with 2-hydroxyethyl acrylate and tolylene diisocyanate; molecular weight: 25,000) | 40 parts |
| CH$_2$=CHCH$_2$O—[triazine ring]—OCH$_2$CH=CH$_2$, OCH$_2$CH=CH$_2$ | 60 parts |
| Lecithin | 4 parts |
| Stearic acid | 4 parts |
| Butyl stearate | 4 parts |
| Al$_2$O$_3$ | 4 parts |
| Carbon black | 10 parts |

| -continued | |
|---|---|
| Methyl ethyl ketone | 1000 parts |

The above composition was mixed and kneaded in a ball mill for 50 hours to prepare a magnetic coating composition, which was then coated by a doctor blade coating method on a 15 μm-thick polyethylene terephthalate support in a dry thickness of 5 μm and was subjected to magnetic orientation using cobalt magnets, and the solvent was volatilized for 1 minute at 100° C. Then, the thus-obtained magnetic web was subjected to smoothing treatment (roll temperature; 60° C.) using five pairs of calenders comprised of a cotton roller and a mirror roller.

Then, the magnetic web was irradiated at an accelerating voltage of 165 kV and a beam current of 5 mA, so that the absorption dose was 10 Mrads. The resulting sample tape was designated as Sample No. 1.

EXAMPLES 2 AND 3 AND COMPARATIVE EXAMPLES 1 AND 2

The same procedure as in Example 1 was repeated to obtain additional samples (Samples Nos. 2-5), except that the ingredients for a binder of Example 1 were changed to those as shown in Table 1.

TABLE 1

| | Sample No. | Binder Ingredients | Amount (parts) |
|---|---|---|---|
| Comparative Example 1 | 2 | Urethane acrylate oligomer as used in Example 1<br>Trimethylolpropane triacrylate | 40<br>60 |
| Example 2 | 3 | Urethane resin (a condensation product of adipic acid, butanediol and tolylene diisocyanate; number average molecular weight: 30,000)<br><br>$(CH_2=CHOCOC_2H_4)_2N-C(=N)-N(C_2H_4OCOCH=CH_2)_2$ with triazine ring bearing $N(C_2H_4OCOCH=CH_2)_2$ | 70<br><br><br><br>30 |
| Example 3 | 4 | Urethane acrylate oligomer (a urethane acrylate oligomer having acryloyl group at the terminal which is obtained by the reaction of urethane prepolymer having NCO at the terminal comprised of adipic acid, butanediol and tolylene diisocyanate with 2-hydroxyethyl acrylate; molecular weight: 3,000)<br><br>$CH=CHCH_2O-C(=N)-OCH_2CH=CH_2$ with triazine ring bearing $OCH_2CH=CH_2$ | 70<br><br><br><br><br><br>30 |
| Comparative Example 2* | 5 | Nitrocellulose<br>Urethane resin as same as that in Example 2<br>Adduct of trimethylol propane with 3 moles of tolylene diisocyanate | 50<br>30<br>20 |

*In comparative Example 2, heat treatment was conducted at 60° C. for 5 days, instead of electron beam irradiation.

Regarding these samples in Examples 1 to 3 and in Comparative Examples 1 and 2, the durability time in a still mode, stain of the video head after repeated use (100 times), and chroma S/N using a video tape recorder were measured, and the results thereof are shown in Table 2.

The durability time in a still mode

The durability time in a still mode was measured by recording video signals on video tapes (each sample) and reproducing signals using VHS video tape recorder (NV-8200 type", a trademark, manufactured by Matsushita Electric Industrial Co., Ltd.), and it is shown in terms of time for the still images to lose their clarity in the reproduced signals. The test was conducted at 5° C., and 80% RH (relative humidity).

Stain of the video head

After sample tapes were used repeatedly 100 times on a video tape recorder "NV-8200 type", stain of the video head was comparatively observed by a microscope and the results were evaluated on a three-grade basis.

A indicates that no stain was observed.
B indicates that detectable stain was observed.
C indicates that stain was observed.

Chroma S/N

Chroma S/N (chroma signal/noise ratio) of video color signals was measured and compared to the S/N of Sample No. 1 as 0 dB.

TABLE 2

| Sample No. | Durability Time in a still mode | Stain of the video head | Chroma S/N |
|---|---|---|---|
| 1 | 60 min. or more | A | 0 dB |
| 2 | 5 min. | C | −1.0 dB |
| 3 | 60 min. or more | B | −0.2 dB |
| 4 | 60 min. or more | A | −0.1 dB |
| 5 | 20 min. | C | −3.0 dB |

It is apparent from the results in Table 2 that electromagnetic properties as well as durability are excellent in accordance the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having provided thereon a magnetic layer containing ferromagnetic particles and a binder, that is exposed to radiation, wherein the binder comprises a compound having one or more triazine rings and at least two vinyl groups per molecule contained in an amount of from 10 to 80 wt% based on the total amount of binder.

2. A magnetic recording medium as in claim 1, wherein the binder further comprises a urethane acrylate oligomer having a molecular weight of 1,000 or more.

3. A magnetic recording medium as in claim 1, wherein the binder further comprises a urethane acrylate oligomer having a molecular weight of 3,000 or more.

4. A magnetic recording medium as in claim 1, wherein the compound has 1 to 3 triazine rings and 2 to 14 vinyl groups per molecule.

5. A magnetic recording medium as in claim 1, wherein the compound is represented by formula (I), (II) or (III):

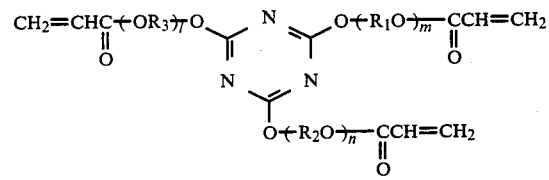
(I)

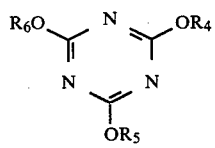
(II)

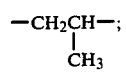
(III)

wherein $R_1$, $R_2$ and $R_3$, each represents $-CH_2CH_2-$ or $$-CH_2CH-\atop{\phantom{-}CH_3}$$ ;

$R_4$, $R_5$ and $R_6$, each represents a hydrogen atom, $-CH_2CH=CH_2$ or

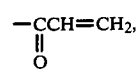

provided that two of $R_4$, $R_5$ and $R_6$ are not a hydrogen atom at the same time; $R_7$, $R_8$, $R_9$, $R_{10}$, $R_{11}$ and $R_{12}$, each represents

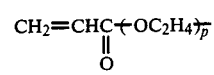

(wherein p is an integer of 1 to 4), $CH_3-$, $C_2H_5-$, iso-$C_3H_7-$ or a hydrogen atom, provided that at least two of $R_7$ to $R_{12}$ are

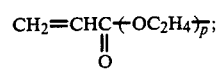

and l, m and n are 0 or an integer of 1 to 4, provided that l, m and n are not 0 at the same time.

6. A magnetic recording medium as in claim 1, wherein the compound containing a triazine and at least two vinyl groups is contained in an amount of from 20 to 70 wt% based on the total amount of binder.

7. A magnetic recording medium as in claim 2, wherein the compound containing a triazine and at least two vinyl groups is contained in an amount of from 20 to 70 wt% based on the total amount of binder.

8. A magnetic recording medium as in claim 2, wherein the urethane acrylate oligomer is contained in an amount of from 20 to 90 wt% based on the total amount of binder.

9. A magnetic recording medium as in claim 3, wherein the urethane acrylate oligomer is contained in an amount of from 20 to 90 wt% based on the total amount of binder.

* * * * *